US011613317B2

(12) United States Patent
Chiang

(10) Patent No.: US 11,613,317 B2
(45) Date of Patent: Mar. 28, 2023

(54) TRACK ROLLER ASSEMBLY

(71) Applicant: EVERPADS CO., LTD., Taichung (TW)

(72) Inventor: Chun-Li Chiang, Taichung (TW)

(73) Assignee: EVERPADS CO., LTD., Taichung (TW)

( * ) Notice: Subject to any disclaimer, the term of this patent is extended or adjusted under 35 U.S.C. 154(b) by 320 days.

(21) Appl. No.: 16/864,166

(22) Filed: May 1, 2020

(65) Prior Publication Data

US 2020/0361547 A1 Nov. 19, 2020

(30) Foreign Application Priority Data

May 14, 2019 (TW) .................. 108206020

(51) Int. Cl.
*B62D 55/15* (2006.01)
*B62D 55/092* (2006.01)
*F16C 33/74* (2006.01)

(52) U.S. Cl.
CPC ........... *B62D 55/15* (2013.01); *B62D 55/092* (2013.01); *F16C 33/74* (2013.01)

(58) Field of Classification Search
CPC .......... F16C 33/00; F16C 33/72; F16C 33/74; F16C 33/741; F16C 33/743; B62D 55/00; B62D 55/15; B62D 55/092; B62D 55/088; B62D 55/0887
USPC ......................................... 305/136
See application file for complete search history.

(56) References Cited

U.S. PATENT DOCUMENTS

| 2014/0125116 A1* | 5/2014 | Weeks | B62D 55/20 305/100 |
| 2015/0284042 A1* | 10/2015 | Kalmes | B62D 55/15 305/107 |
| 2017/0050689 A1* | 2/2017 | Johannsen | F16J 15/344 |

* cited by examiner

*Primary Examiner* — Nathan Cumar
(74) *Attorney, Agent, or Firm* — CKC & Partners Co., LLC

(57) ABSTRACT

A track roller assembly includes a wheel body, a bearing, a wheel axle, a cap element, a rotating oil seal, an end cover and an oil body. The wheel body has a thread. The bearing is disposed on the wheel body. The wheel axle is disposed through the bearing. The cap element has a screw corresponding to the thread. One side of the rotating oil seal is connected to the cap element, and another side of the rotating oil seal rotatably abuts the wheel axle. The end cover is connected to the wheel axle. The oil body is limited to an accommodating space formed by the wheel body, the wheel axle, the cap element and the rotating oil seal.

10 Claims, 14 Drawing Sheets

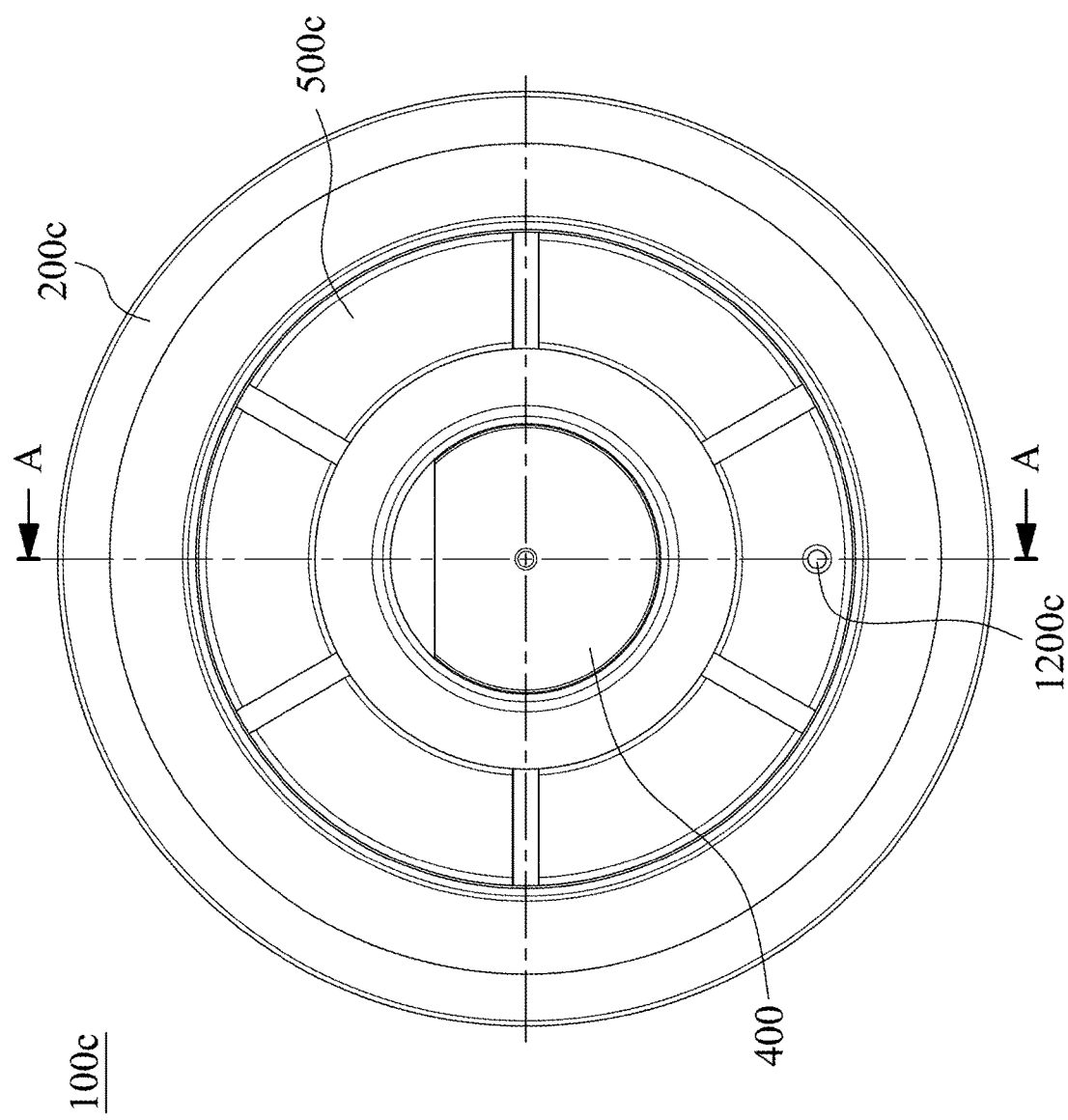

TRACK ROLLER ASSEMBLY

RELATED APPLICATIONS

This application claims priority to Taiwan Application Serial Number 108206020, filed May 14, 2019, which is herein incorporated by reference.

BACKGROUND

Technical Field

The present disclosure relates to a roller assembly. More particularly, the present disclosure relates to a track roller assembly.

Description of Related Art

The track roller assembly (e.g. the track roller assembly of the excavator or the tractor) is often withstood the extreme stress and wear under the extreme operating condition. The track roller assembly is more easily to damage when working under the extreme conditions in the mountain area and the rocky terrain. Therefore, the track roller assembly has the problems of the high maintenance costs, wear resulting in short life, and other constitutive property. The solution of the problems is to constantly keep the track roller assembly lubricated well. However, when the track roller assembly is operated in the difficult area, the lubricating oil body leaked from the internal area to the external area of the track roller assembly is often caused, so that the maintenance cost of repairing the leak or replacing the entire track roller assembly is increased significantly. Other structural problems include the high number of parts for building components, the complexity of the manufacturing process, and the handling for oil body lubricants during the construction.

The conventional track roller assembly uses a pair of laterally spaced end covers to connect a wheel axle, and supports the wheel axle in the blind hole limited by the cylindrical inner wall and the end wall. The support assembly is mounted in the blind hole and is inserted between the end cover and the wheel axle, and includes the sleeve type cylindrical bushing supported by the inner wall and the disc type thrust washer fixed to the end wall. The vertically extending passage in the end wall accommodates the oil body lubricant, for example, the oil body that can be guided through an orifice to the roller assembly. Although the conventional track roller assembly uses the bushing and the thrust washer, it does not solve the long-standing oil leakage problem, that is, the problem of oil leakage is easy to occur under the extreme working conditions. It can be seen that a kind of the track roller assembly which can prevent oil leakage and does not fail is lack at present market, so the relevant industry is seeking the solution.

SUMMARY

According to one aspect of the present disclosure, a track roller assembly is provided. The track roller assembly includes a wheel body, a bearing, a wheel axle, a cap element, a rotation oil seal, an end cover and an oil body. The wheel body has a thread. The bearing is disposed on the wheel body. The wheel axle is disposed through the bearing. The cap element has a screw corresponding to the thread, and the screw correspondingly locked and engaged in the thread. One side of the rotating oil seal is connected to the cap element, and another side of the rotating oil seal rotatably abuts the wheel axle. The end cover is connected to the wheel axle. The oil body is limited to an accommodating space formed by the wheel body, the wheel axle, the cap element and the rotating oil seal.

According to another aspect of the present disclosure, a track roller assembly is provided. The track roller assembly includes two wheel bodies, two bearings, a wheel axle, two cap elements, two rotating oil seals, two end covers and an oil body. The two wheel bodies are connected to each other, and each of the two wheel bodies has a thread. The bearings are disposed on the two wheel bodies, respectively. The wheel axle is disposed through the two bearings. Each of the two cap elements has a screw corresponding to the thread, and the screw is correspondingly locked and engaged in the thread. One side of each of the two rotating oil seals is connected to each of the two cap elements, and another side of each of the two rotating oil seals rotatably abuts the wheel axle. The two end covers are connected to opposite two ends of the wheel axle, respectively. The oil body is limited to an accommodating space formed by the two wheel bodies, the wheel axle, the two cap elements and the two rotating oil seals.

BRIEF DESCRIPTION OF THE DRAWINGS

The present disclosure can be more fully understood by reading the following detailed description of the embodiment, with reference made to the accompanying drawings as follows:

FIG. 13A is a side schematic view of a track roller assembly according to still another embodiment of the present disclosure.

DETAILED DESCRIPTION

Figure 1:
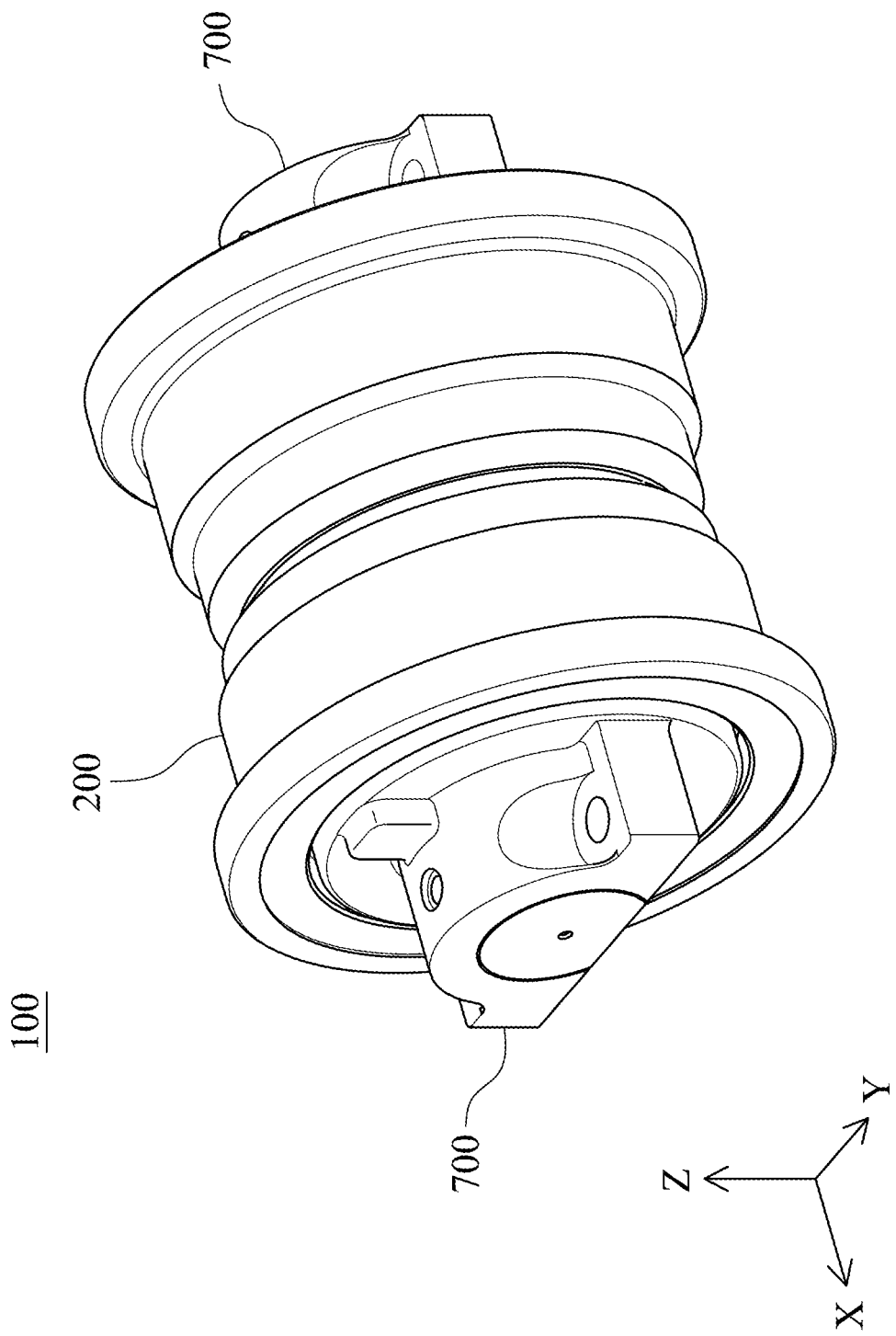
FIG. 1 is a three-dimensional schematic view of a track roller assembly according to one embodiment of the present disclosure.

The present disclosure will be further exemplified by the following specific embodiments along drawings thereof so as to facilitate utilizing and practicing the present disclosure completely by the people skilled in the art without over-interpreting and over-experimenting. However, the readers should understand that the present disclosure should not be limited to these practical details thereof, that is, in some embodiments, these practical details are used to describe how to implement the materials and methods of the present disclosure and are not necessary. Furthermore, in order to simplify the drawings, some conventional structures and elements will be illustrated in a simple manner in the drawings, and the repeated elements may be represented by the same reference numerals.

Furthermore, in the present specification, when one element (or, structure and module) "is connected to", "is disposed on" or "is linked to" another element, it means the element can be directly connected to, disposed on or linked to another element or be indirectly connected to, disposed on or linked to another element (that is, there is an element disposed between the aforementioned element and another element). In other words, if an element is exactly illustrated as being "directly connected to", "directly disposed on" or "directly linked to" another element, there is without an element disposed between the aforementioned element and another element. Furthermore, the terms of "first", "second" and "third" are only for illustrating different elements or components and not used to limit the elements or components themselves. Thus, the first element/component can be named as the second element/component. Moreover, the combination of the elements/component/structures/modules described in the present specification are not well-known, conventional or common combination in the field, and it is hard for the person skilled in the arts to determine whether the combination relationship is obviousness or not based on the elements/components/structures/modules themselves are conventional or not.

Figure 2:
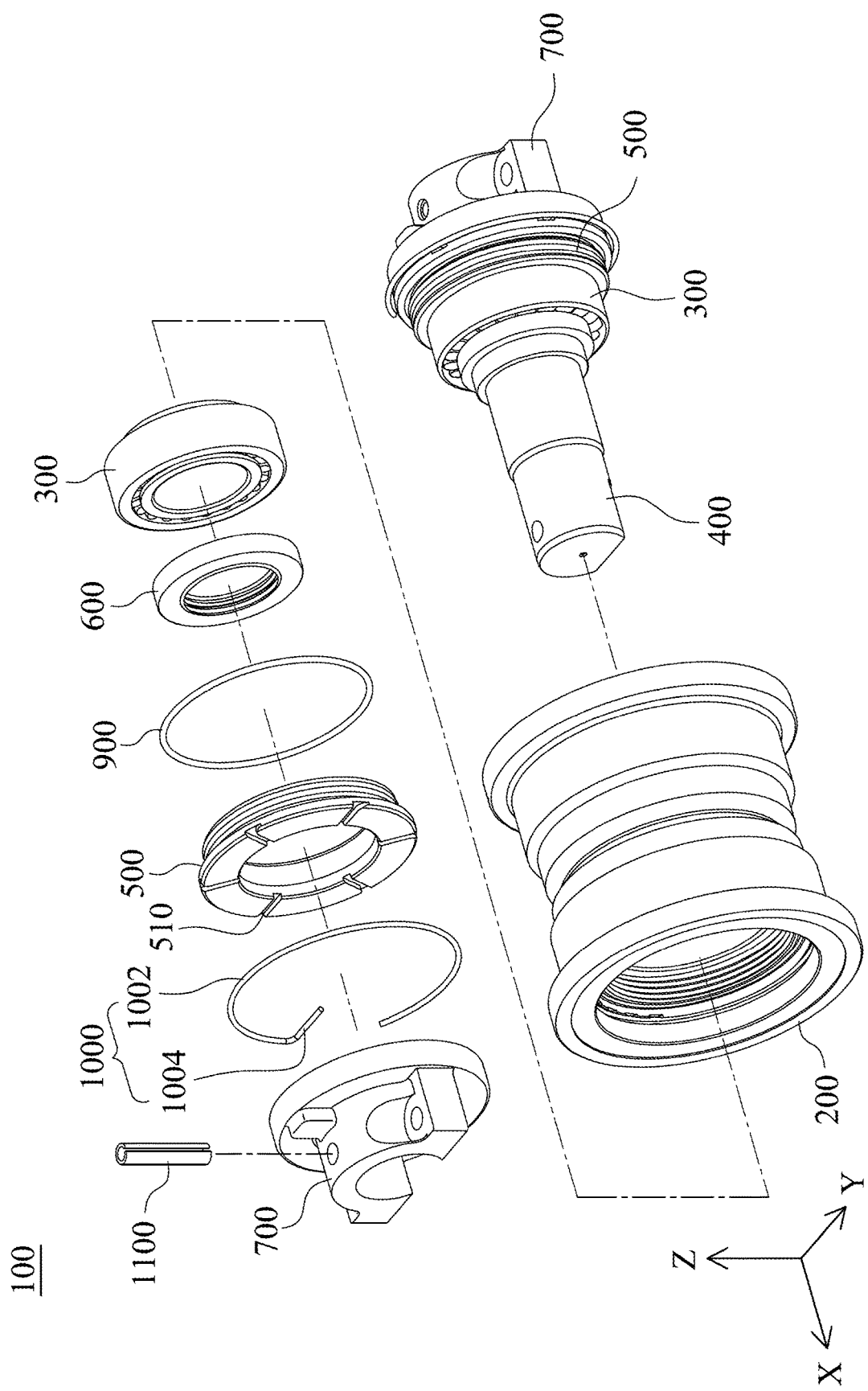
FIG. 2 is an exploded view of the track roller assembly as shown in FIG. 1.
Figure 3:
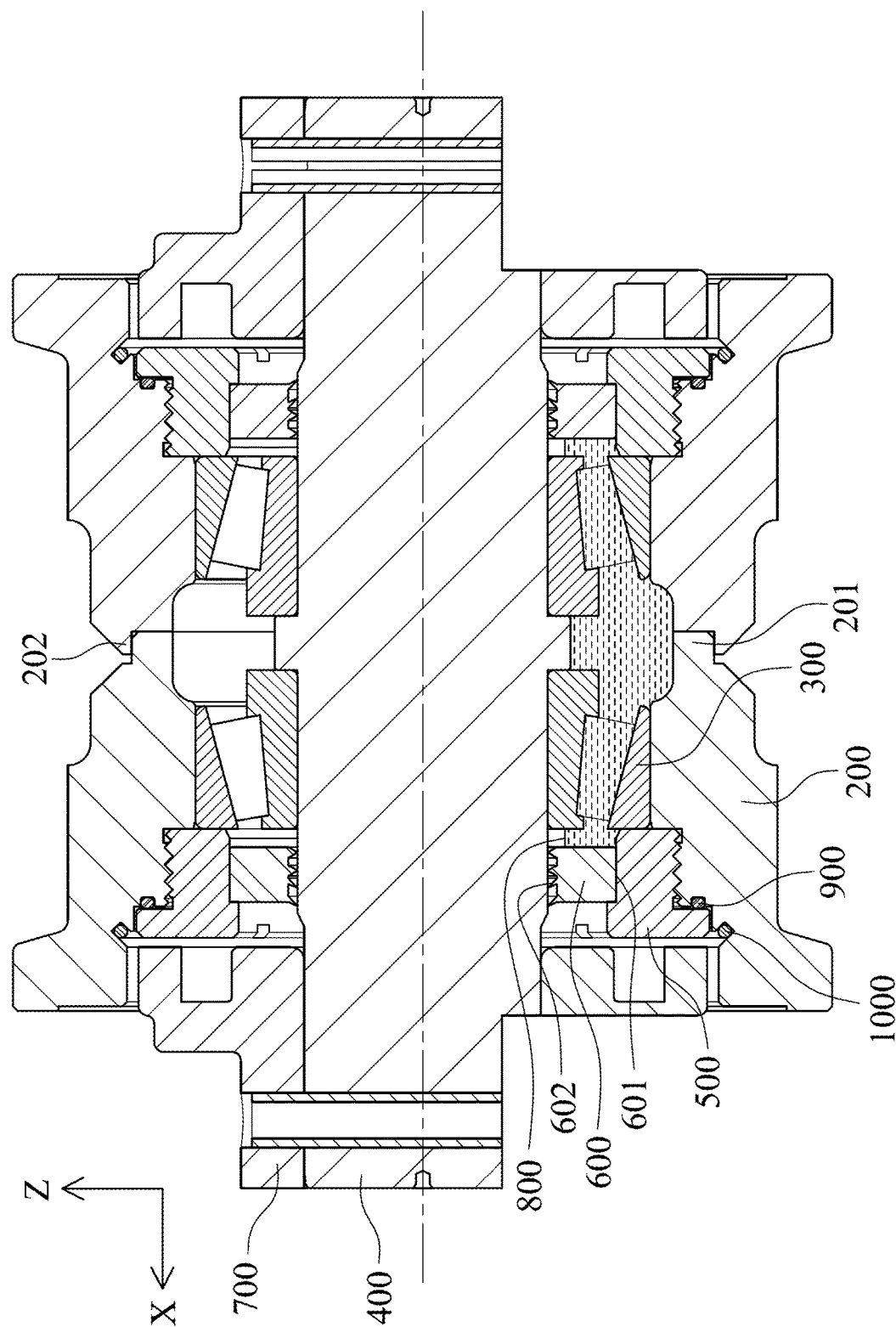
FIG. 3 is a cross-sectional view of the track roller assembly as shown in FIG. 1.
Figure 4:
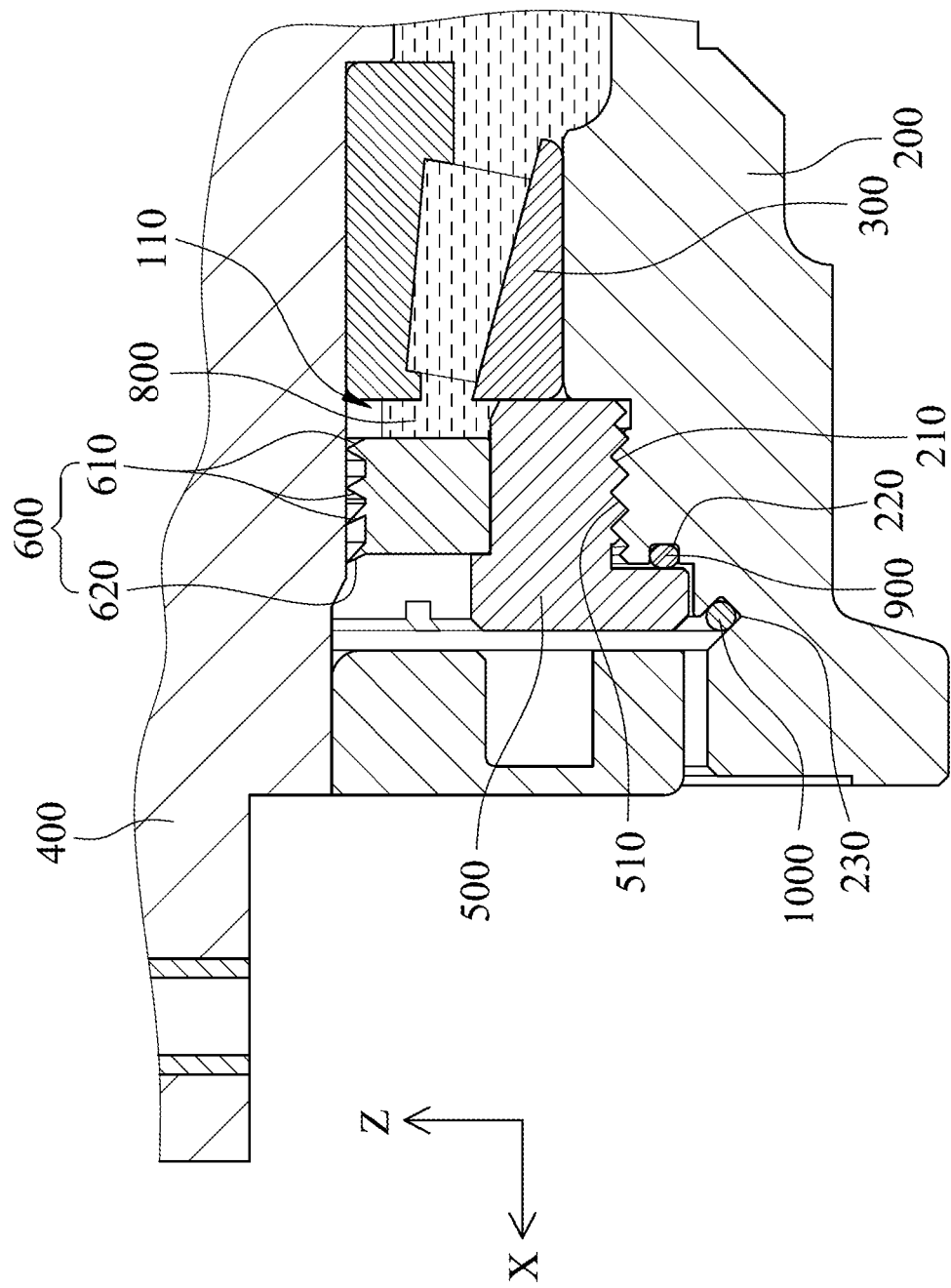
FIG. 4 is a partial cross-sectional view of the track roller assembly as shown in FIG. 1.
Figure 5:
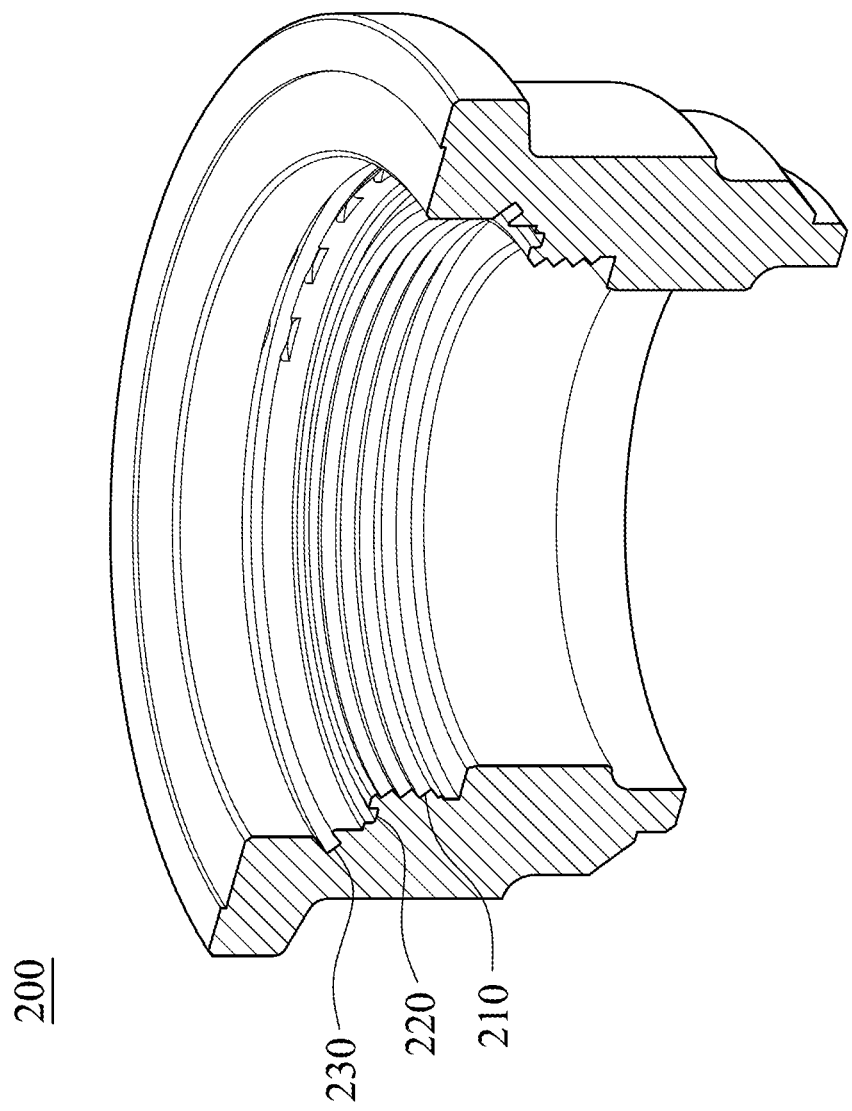
FIG. 5 is a schematic view of a wheel body of the track roller assembly as shown in FIG. 1.
Figure 6:
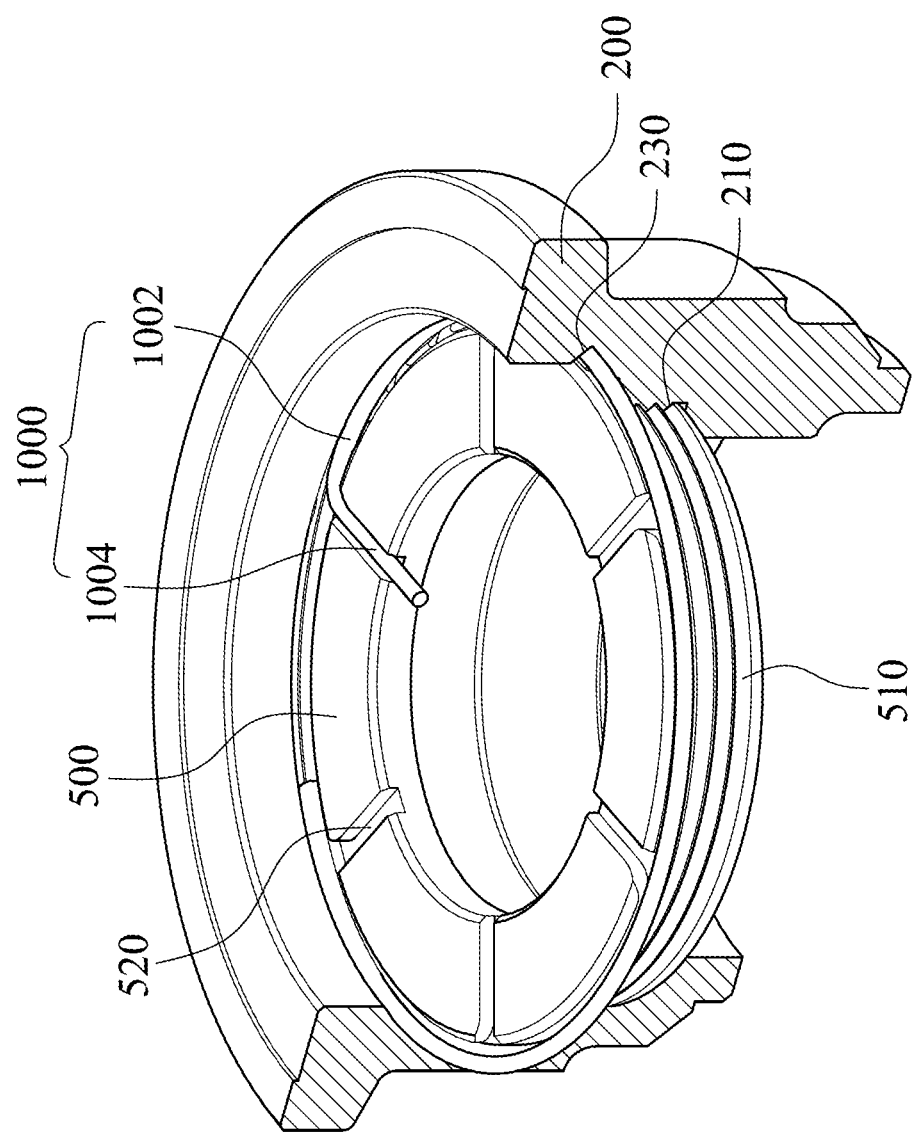
FIG. 6 is a schematic view of a connection among the wheel body, a cap element and a limiting element of the track roller assembly as shown in FIG. 1.

Please refer to FIG. 1 to FIG. 6, wherein FIG. 1 is a three-dimensional schematic view of a track roller assembly 100 according to one embodiment of the present disclosure. FIG. 2 is an exploded view of the track roller assembly 100 as shown in FIG. 1. FIG. 3 is a cross-sectional view of the track roller assembly 100 as shown in FIG. 1. FIG. 4 is a partial cross-sectional view of the track roller assembly 100 as shown in FIG. 1. FIG. 5 is a schematic view of a wheel body 200 of the track roller assembly 100 as shown in FIG. 1. FIG. 6 is a schematic view of a connection among the wheel body 200, a cap element 500 and a limiting element 1000 of the track roller assembly 100 as shown in FIG. 1. As shown in FIG. 1 to FIG. 6, the track roller assembly 100 includes two wheel bodies 200, two bearings 300, a wheel axle 400, two cap elements 500, two rotating oil seals 600, two end covers 700, an oil body 800, two O-rings 900, two limiting elements 1000 and two first plugs 1100.

The two wheel bodies 200 are connected to each other. One of the two wheel bodies 200 includes a convex portion 201, and the other of the two wheel bodies 200 includes a concave portion 202. The convex portion 201 is correspondingly engaged into the concave portion 202, so that the two wheel bodies 200 are joined tightly. Furthermore, each of the two wheel bodies 200 is a hollow cylindrical shape and includes a plurality of threads 210, a ring groove 220 and a limiting groove 230. The threads 210 are used for locking each of the two cap elements 500. The ring groove 220 is disposed on an inner wall of each of the two wheel bodies 200 for accommodating each of the two O-rings 900. The limiting groove 230 is disposed on the inner wall of each of the two wheel bodies 200 for accommodating each of the two limiting elements 1000. The outer side surface of each of the two wheel bodies 200 is connected to the track, thus causing each of the two wheel bodies 200 to rotate. In other embodiments, the two wheel bodies can be integrally formed, and does not limit to the present disclosure.

The two bearings 300 are disposed on the two wheel bodies 200, respectively. The wheel axle 400 is disposed through the two bearings 300. The structure of the two bearings 300 are the same as each other. Each of the two bearings 300 is pivoted between each of the two wheel bodies 200 and the wheel axle 400.

Each of the two cap elements 500 has a plurality of screws 510 corresponding to the threads 210. The screws 510 are correspondingly locked and engaged in the threads 210. Furthermore, each of the two cap elements 500 is a hollow annular shape and includes an inner annular surface and a bottom surface. The inner annular surface is abutted to each of the two rotating oil seals 600, and the bottom surface is abutted to each of the two bearings 300.

A first side 601 (outer side) of each of the two rotating oil seals 600 is connected to the inner annular face of each of the two cap elements 500, and a second side 602 (inner side) of each of the two rotating oil seals 600 rotatably abuts the wheel axle 400. Specifically, each of the two rotating oil seals 600 includes three oil blocking portions 610 and a dustproof portion 620. Each of the three oil blocking portions 610 rotatably abuts the wheel axle 400 and approaches to the oil body 800. The each of the three oil blocking portions 610 can block the oil body 800 from leaving an accommodating space 110. The accommodating space 110 is a space formed by the two wheel bodies 200, the wheel axle 400, two cap elements 500 and two rotating oil seals 600. The dustproof portion 620 rotatably abuts the wheel axle 400 and away from the oil body 800. The dustproof portion 620 is inclined toward an X-axis direction (i.e. the axial direction of the wheel axle 400) and can block the outside dust from entering the accommodating space 110. Each of the three oil blocking portions 610 and the dustproof portion 620 are made of a soft material and directly connected to the wheel axle 400. When the track moves, each of the two wheel bodies 200, each of the two cap elements 500 and each of the two rotating oil seals 600 are interlocked and rotated opposite to the wheel axle 400. In other words, when the track moves, each of the three oil blocking portions 610 and the dustproof portion 620 are rotated opposite to the wheel axle 400 so as to rub with the wheel axle 400. In other embodiments, the number of the oil blocking portion can be adjusted according to the demand and not limit to the present disclosure.

The two end covers 700 are connected to opposite two ends of the wheel axle 400, respectively. The two end covers 700 are fixed to a caterpillar by the screw lock. The screw lock structure is the conventional technology, and will not be described herein.

The oil body 800 is limited to the accommodating space 110 formed by the two wheel bodies 200, the wheel axle 400, the two cap elements 500 and the two rotating oil seals 600. The oil body 800 is used for lubricating the two bearings 300, so that the track roller assembly 100 can be rotated normally.

Each of the two O-rings 900 is disposed between each of the two cap elements 500 and each of the two wheel bodies 200, and each of the two O-rings 900 is made of a flexible material. Each of the two O-rings 900 is disposed between the ring groove 220 of each of the two wheel bodies 200 and each of the two cap elements 500. When the screws 510 of each of the two cap elements 500 are correspondingly locked and engaged to the threads 210 of each of the two wheel bodies 200, each of the two O-rings 900 is deformed by each of the two cap elements 500 and the ring groove 220 of each of the two wheel bodies 200 pressing each other so as to fill the gap between each of the two cap elements 500 and each of the two wheel bodies 200, then the oil body 800 is blocked from leaking to achieve the oil tightness.

Each of the two limiting elements 1000 is disposed between each of the two cap elements 500 and each of the two wheel bodies 200, and each of the two limiting elements 1000 limits each of the two cap elements 500. That is, each of the two limiting elements 1000 prevents each of the two cap elements 500 from moving toward the X-axis direction, and each of the two limiting elements 1000 is disposed between the limiting groove 230 and each of the two cap elements 500. Each of the two limiting elements 1000 includes a first limiting section 1002 and a second limiting section 1004. The first limiting section 1002 is connected to the second limiting section 1004, and the first limiting section 1002 is engaged into the limiting groove 230. Furthermore, each of the two cap elements 500 includes a plurality of fixing grooves 520, and the second limiting section 1004 is engaged into one of the fixing grooves 520, so that each of the two cap elements 500 is fixed and abutted closely to each of the two wheel bodies 200 without being loosened.

Each of the two first plugs 1100 is detachably connected to each of the two end covers 700 and the wheel axle 400. Each of the two end covers 700 and the wheel axle 400 includes a hole, and each of the two first plugs 1100 can be disposed through the hole of each of the two end covers 700 and the wheel axle 400, so that the wheel axle 400 is fixed to each of the two end covers 700.

Furthermore, it is worth mentioning that even if the oil level of the oil body 800 is lower than that of the oil blocking portion 610, the bearing 300 can be immersed in the oil body 800 to be lubricated. Then, when the oil level of the oil body 800 is lower than that of the oil blocking portion 610, the oil body 800 is affected by the gravity so as to maintain in the lower half of the accommodating space 110. Therefore, under the condition that the cap element 500 is engaged the wheel body 200 and the rotating oil seal 600 without oil leakage, the oil body 800 can ensure no overflow in the accommodating space 110. In other embodiments, the track roller assembly can include a wheel body, a bearing, a wheel axle, a cap element, a rotating oil sealing, an end cover and an oil body. The wheel body is a circular groove shape. The number of each of the components is depended on the demand, and does not limit to the present disclosure. Therefore, the track roller assembly 100 of the present disclosure is locked to the two wheel bodies 200 by the two cap elements 500, respectively, and combined with the two rotating oil seals 600. The symmetry structure is achieved over the entire assembly, which can prevent the oil body 800 from overflowing so as to reduce the probability of oil leakage. Moreover, the oil body 800 is affected by the gravity so as to maintain in the lower half of the accommodating space 110, and the bearing 300 can continue to operate without causing the track roller assembly 100 to fail.

Figure 7:
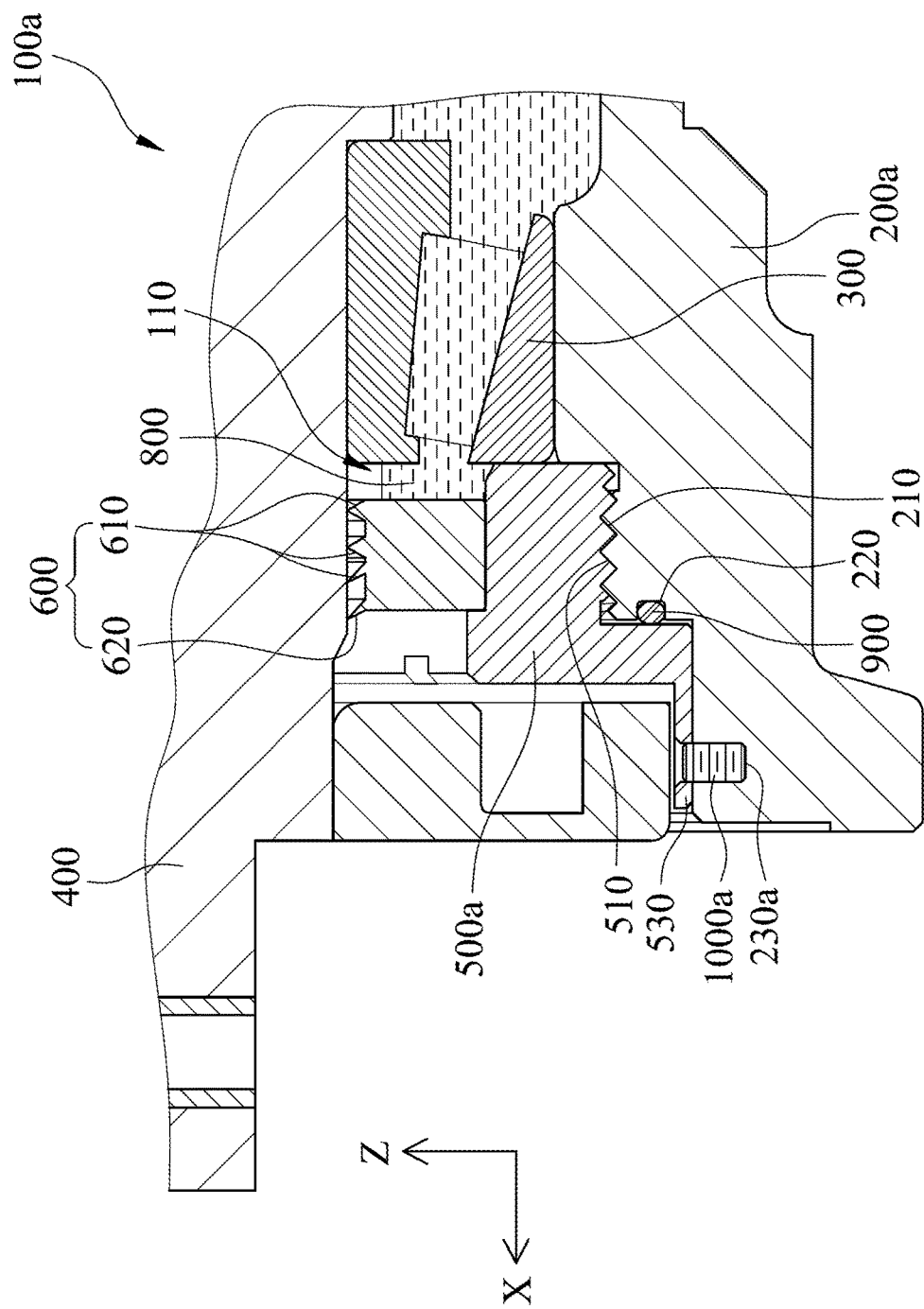
FIG. 7 is a three-dimensional schematic view of a track roller assembly according to another embodiment of the present disclosure.

Please refer to FIG. 2, FIG. 4 and FIG. 7, wherein FIG. 7 is a three-dimensional schematic view of a track roller assembly 100a according to another embodiment of the present disclosure. The track roller assembly 100a includes a wheel body 200a, a bearing 300, a wheel axle 400, a cap element 500a, a rotating oil seal 600, an end cover (not shown), an oil body 800, an O-ring 900, a limiting element 1000a and a first plug (not shown).

In the embodiment of FIG. 7, the structures of the bearing 300, the wheel axle 400, the rotating oil seal 600, the end cover, the oil body 800, the O-ring 900 and the first plug are the same as the structures of the bearing 300, the wheel axle 400, the rotating oil seal 600, the end cover 700, the oil body 800, the O-ring 900 and the first plug 1100 of FIG. 2 and FIG. 4, and will not be described herein. Particularly, the track roller assembly 100a of FIG. 7 further includes the wheel body 200a, the cap element 500a and the limiting element 1000a. The wheel body 200a includes a plurality of threads 210, a ring groove 220 and a limiting groove 230a, and the cap element 500a includes a plurality of screws 510 and a limiting portion 530. The screws 510 are correspondingly locked and engaged in the threads 210, and the ring groove 220 is for accommodating the O-ring 900. The limiting portion 530 has a limiting hole, and the limiting element 1000a is correspondingly passed through the limiting hole of the limiting portion 530 and locked to the limiting groove 230a, so that the wheel body 200a and the cap element 500a are positioned with each other. Therefore, the track roller assembly 100a of the present disclosure is locked and connected by the limiting element 1000a, the limiting groove 230a and the limiting portion 530, and is collocated with the oil seal of the O-ring 900 and the screw engagement between the screws 510 and the threads 210 to ensure the oil body 800 without leaking and the track roller assembly 100a without failing.

Figure 9:
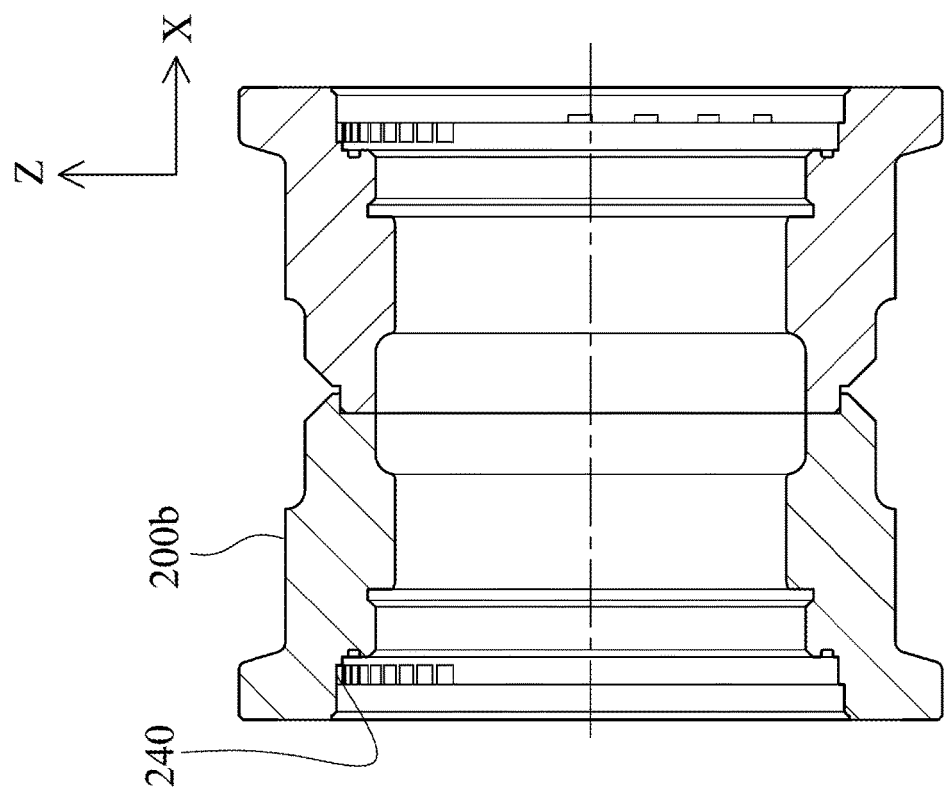
FIG. 9 is a cross-sectional view of the wheel body as shown in FIG. 8.
Figure 8:
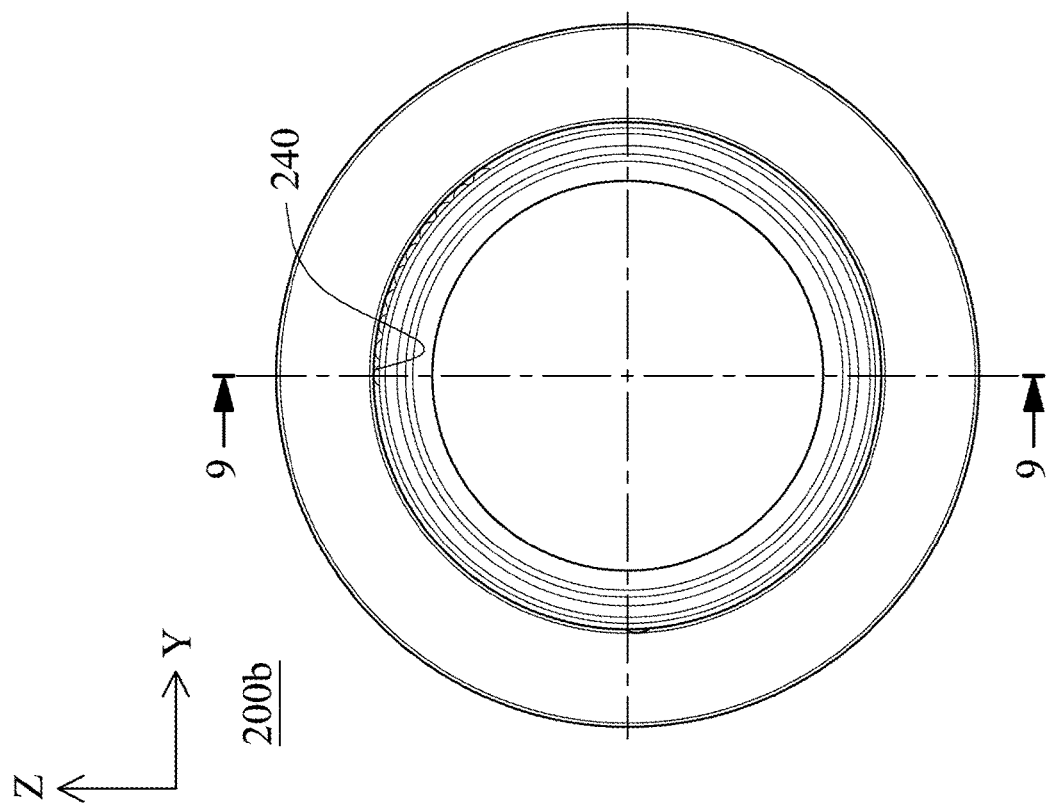
FIG. 8 is a schematic view of a wheel body of the track roller assembly according to further another embodiment of the present disclosure.
Figure 11:
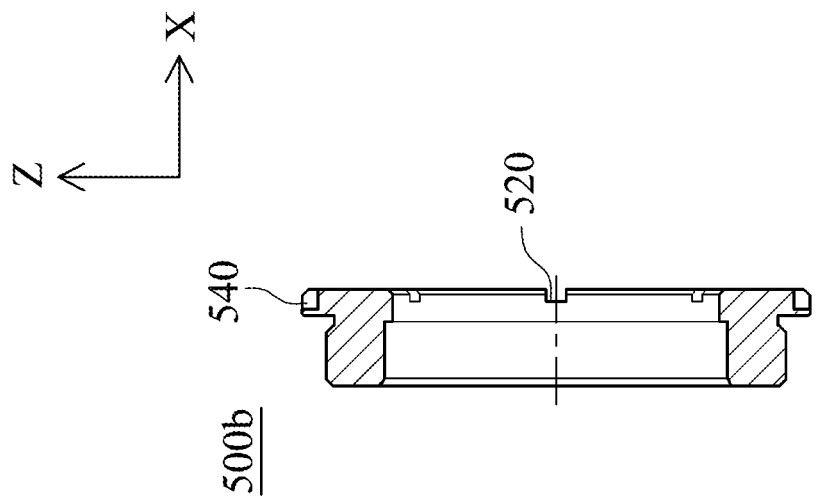
FIG. 11 is a cross-sectional view of the cap element as shown in FIG. 10.
Figure 10:
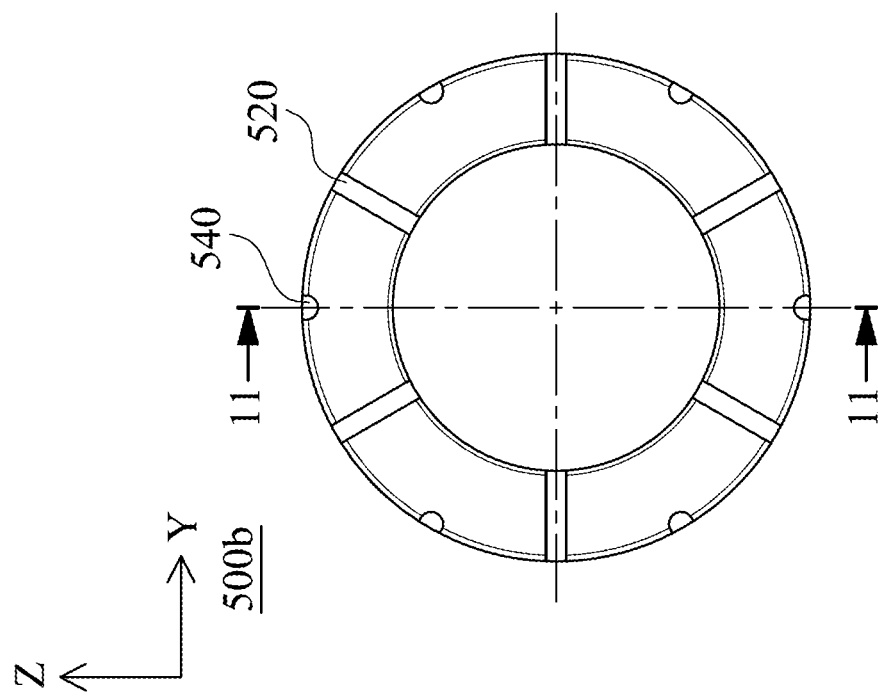
FIG. 10 is a schematic view of the cap element of the track roller assembly according to the further another embodiment of the present disclosure.
Figure 12:
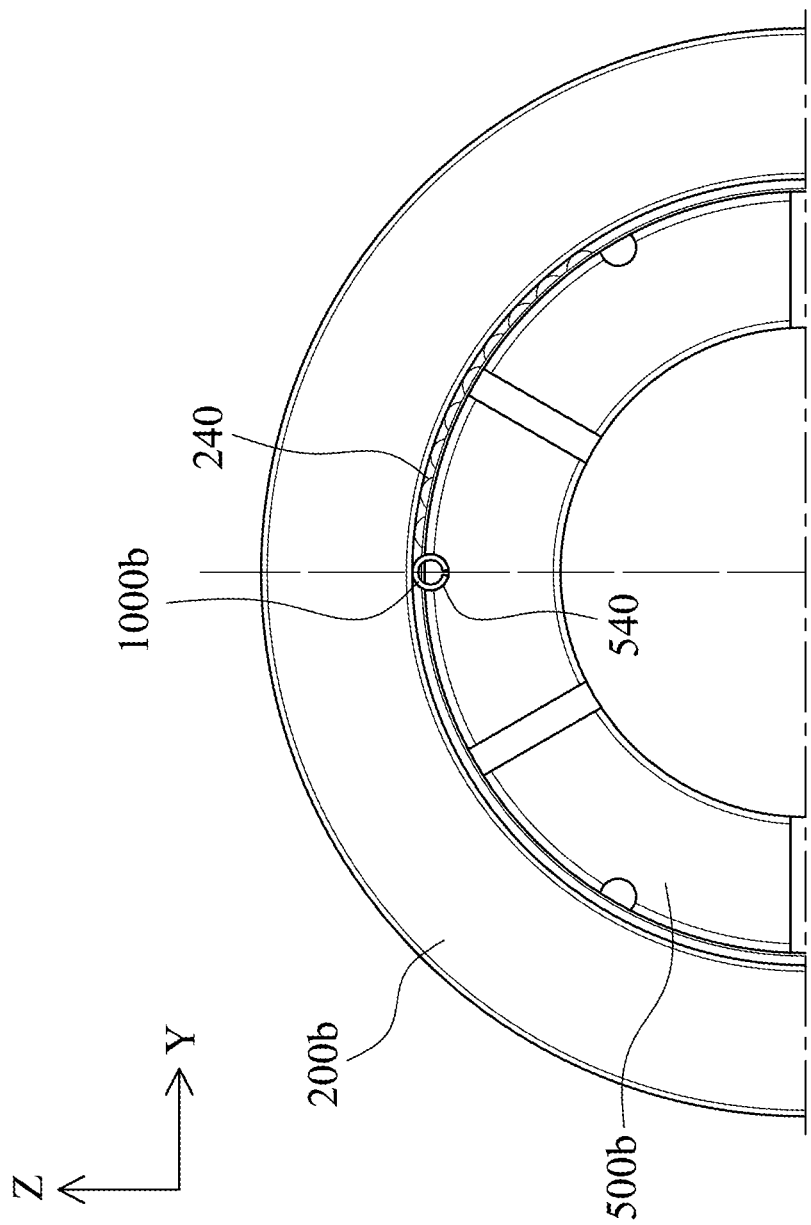
FIG. 12 is a schematic view of a combination of the wheel body, the cap element and the limiting element.

Please refer to FIG. 8, FIG. 9, FIG. 10, FIG. 11 and FIG. 12, wherein FIG. 8 is a schematic view of a wheel body 200b of the track roller assembly according to further another embodiment of the present disclosure. FIG. 9 is a cross-sectional view of the wheel body 200b as shown in FIG. 8. FIG. 10 is a schematic view of the cap element 500b of the track roller assembly according to the further another embodiment of the present disclosure. FIG. 11 is a cross-sectional view of the cap element 500b as shown in FIG. 10. FIG. 12 is a schematic view of a combination of the wheel body 200b, the cap element 500b and the limiting element 1000b. In FIGS. 8-12, the limiting element 1000b is disposed between the wheel body 200b and the cap element 500b. A plurality of limiting notches 240 are disposed on an inner wall of the wheel body 200b, and a plurality of slots 540 are disposed on an outer wall of the cap element 500b. The slots 540 are arranged with an interval from each other. The limiting element 1000b is disposed between one of the limiting notches 240 and one of the slots 540 of the cap element 500b. The limiting element 1000b of the embodiment is a spring plug, the number of the slots 540 of the cap element 500b is six, and the limiting notches 240 are sequentially adjacent, but do not limit to the present disclosure. Therefore, the engagement of the wheel body 200b, the cap element 500b and the limiting element 1000b of the present disclosure can prevent the relative rotation of the wheel body 200b and the cap element 500b. Furthermore, the engagement of the threads 210 with the screws 510 can further prevent the cap element 500 from moving toward the X-axis direction.

Figure 13B:
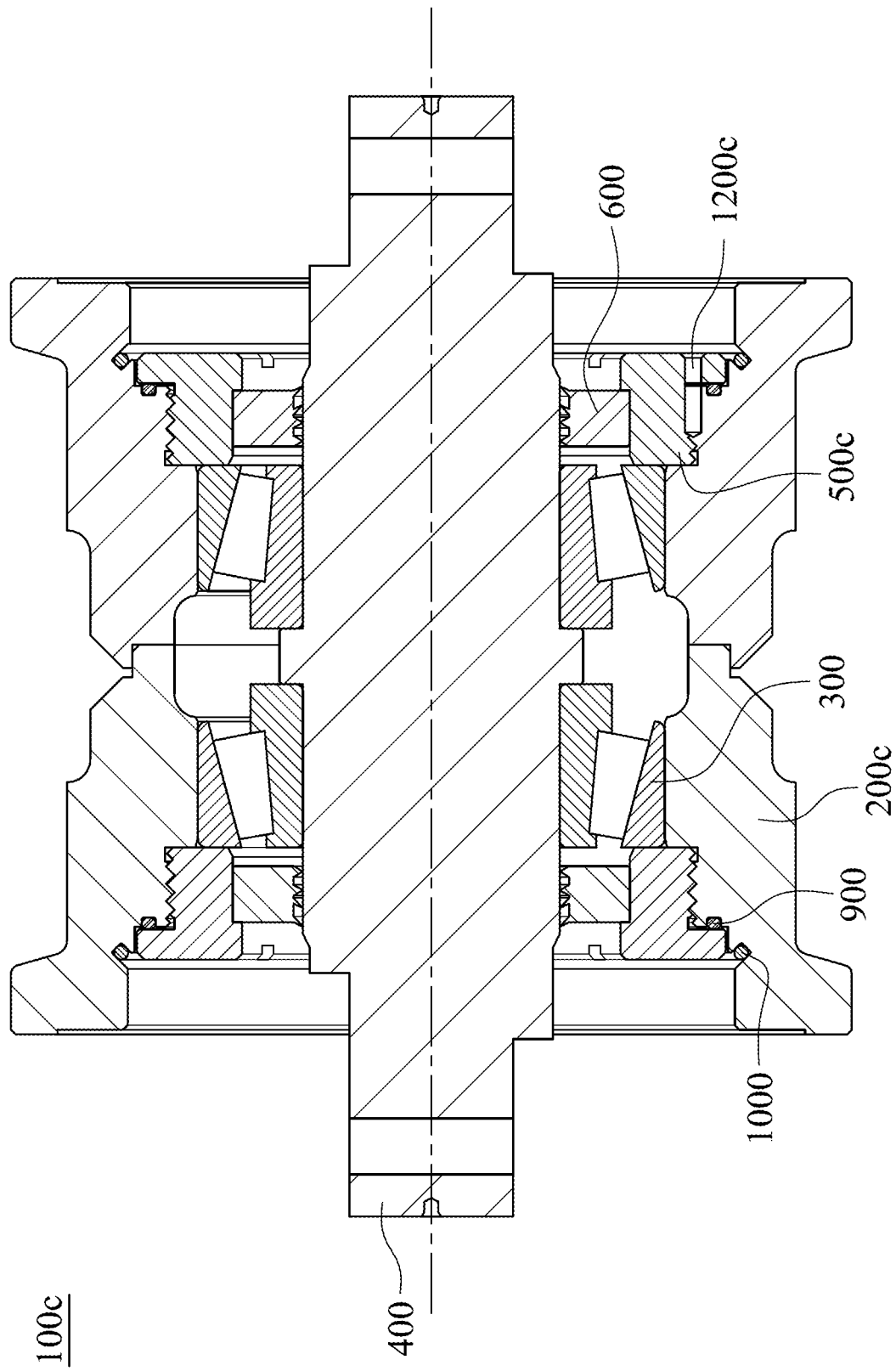
FIG. 13B is a cross-sectional view of the track roller assembly along line A-A as shown in FIG. 13A.

Please refer to FIG. 3, FIG. 13A and FIG. 13B, wherein FIG. 13A is a side schematic view of a track roller assembly 100c according to still another embodiment of the present disclosure. FIG. 13B is a cross-sectional view of the track roller assembly 100c along line A-A as shown in FIG. 13A. The track roller assembly 100c includes two wheel bodies 200c, two bearings 300, a wheel axle 400, two cap elements 500c, two rotating oil seals 600, two end covers (not shown), an oil body (not shown), two O-rings 900, two limiting elements 1000, two first plugs (not shown) and a second plugs 1200c.

In the embodiment of FIG. 13B, the structures of the bearings 300, the wheel axle 400, the rotating oil seals 600, the end covers, the oil body, the O-rings 900, the limiting elements 1000 and the first plugs are the same as the structures of the bearings 300, the wheel axle 400, the rotating oil seals 600, the end covers 700, the oil body 800, the O-rings 900, the limiting elements 1000 and the first plugs of FIG. 3, and will not be described herein. Particularly, the track roller assembly 100c of FIG. 13A and FIG. 13B further includes a second plug 1200c, and the second plug 1200c is connected to a cap element 500c and a wheel body 200c. Specifically, both of the cap element 500c and the wheel body 200c include a through hole (not shown), and the second plug 1200c can be disposed through the through hole of the cap element 500c and the wheel body 200c. Then, the second plug 1200c abuts a groove (not shown) of the wheel body 200c, so that the cap element 500c is fixed to the wheel body 200c. However, the second plug 1200c can be inserted and welded to the cap element 500c and the wheel body 200c. Furthermore, the second plug 1200c can have the screw, and the through holes of the cap element 500c and the wheel body 200c have the thread. The screw is correspondingly locked and engaged in the thread, and the second plug 1200c can be welded to the cap element 500c and the wheel body 200c.

Figure 14A:
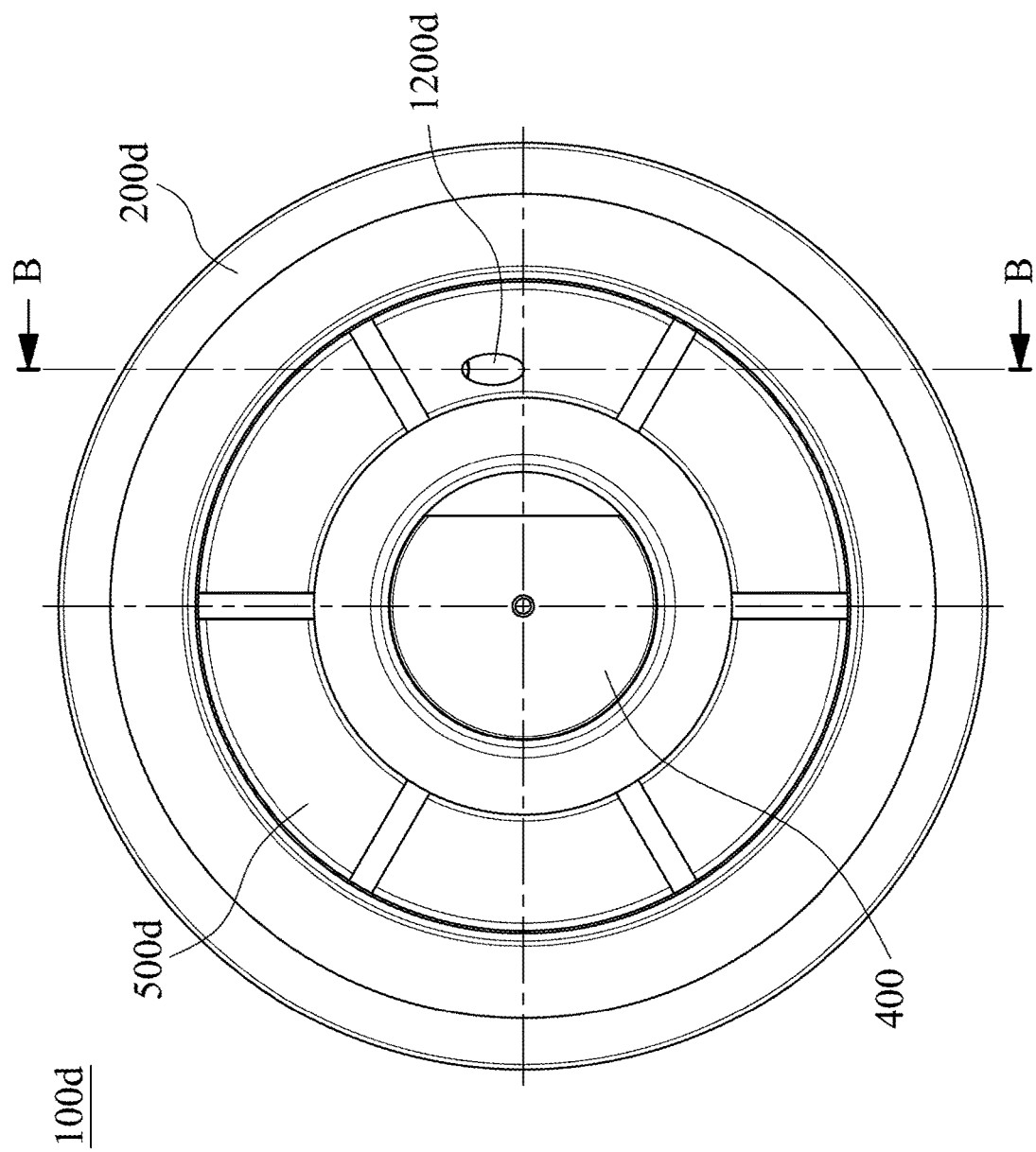
FIG. 14A is a side schematic view of a track roller assembly according to yet another embodiment of the present disclosure.
Figure 14B:
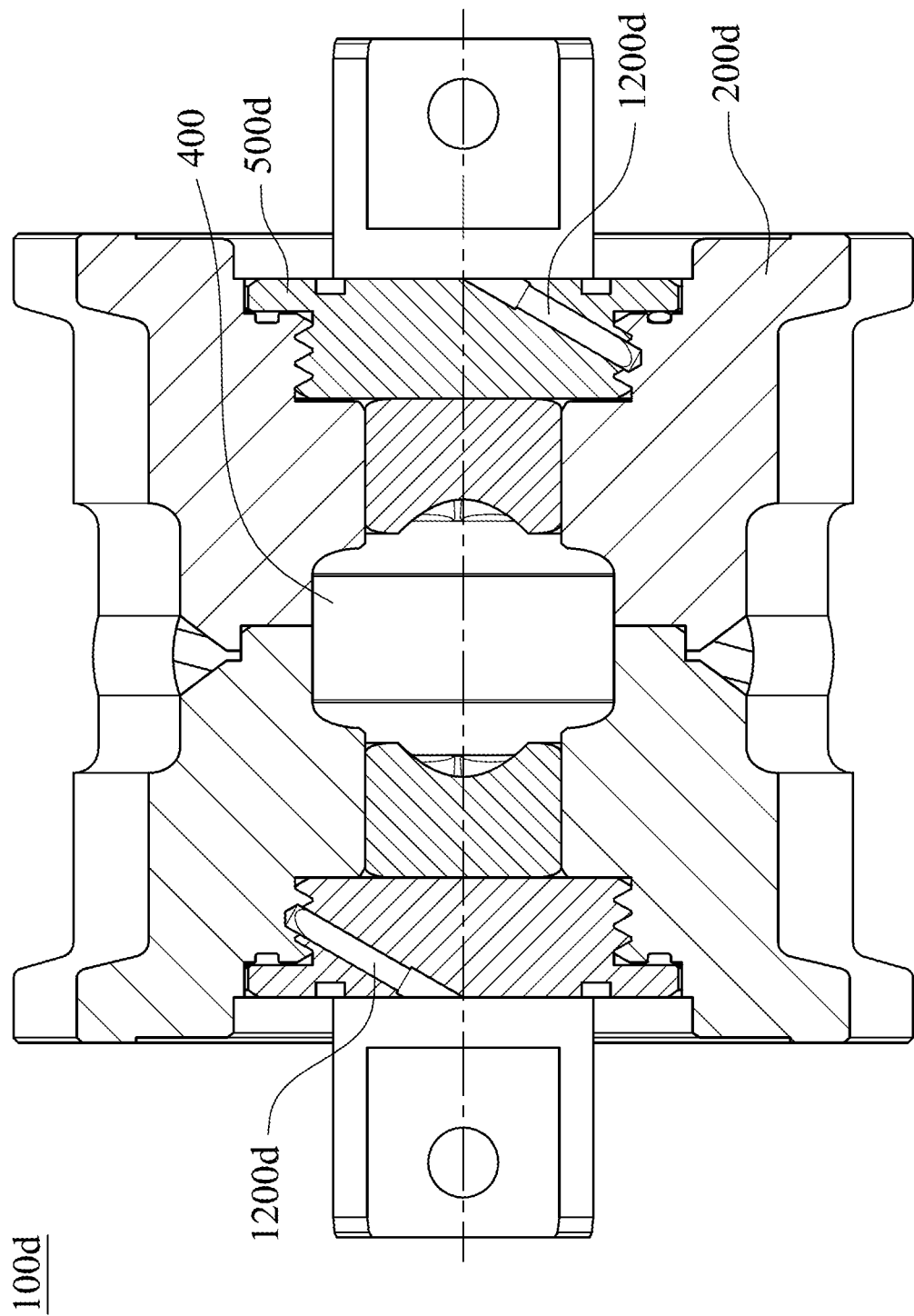
FIG. 14B is a cross-sectional view of the track roller assembly along line B-B as shown in FIG. 14A.

Please refer to FIG. 14A and FIG. 14B, wherein FIG. 14A is a side schematic view of a track roller assembly 100d according to yet another embodiment of the present disclosure. FIG. 14B is a cross-sectional view of the track roller assembly 100d along line B-B as shown in FIG. 14A. The components setting and function of the track roller assembly 100d shown in FIG. 14B are the same as that of track roller assembly 100c shown in FIG. 13B, and will not be described herein. It should be noted that the number of the second plug 1200d is two, and each of the two second plugs 1200d is inserted obliquely into each of the two cap elements 500d and each of the two wheel bodies 200d, wherein each of the two second plugs 1200d is inclined by 60 degrees toward the axial direction of the wheel axle 400.

Specifically, the second plug 1200c of the track roller assembly 100c shown in FIG. 13B is inserted vertically into the cap element 500c, however, the second plugs 1200d of the track roller assembly 100d shown in FIG. 14B is inserted obliquely into each of the two cap elements 500d, but the inserted method and number of the second plug are not limit to the present disclosure. Furthermore, in other embodiments, the track roller assembly can include a wheel body, a bearing, a wheel axle, a cap element, a rotating oil sealing, an end cover, an oil body and a second plug. The wheel body is a circular groove shape. The number of each of the components is depended on the demand, and does not limit to the present disclosure.

According to the aforementioned embodiments, the present disclosure has the advantages described bellowing.

First, the two cap elements are locked to the two wheel bodies, respectively, and combined with the two rotating oil seals, which achieves the entire assembly by the symmetry structure can prevent the oil body from overflowing so as to reduce the probability of oil leakage. Furthermore, the oil body is affected by the gravity so as to maintain in the lower half of the accommodating space, allowing the bearing can continue to operate without causing the track roller assembly to fail.

Second, through the locking and connecting of the limiting element, the limiting groove and the limiting portion, matching with the oil seal of the O-ring and the screw engagement between the screw and the thread to ensure the oil body without leaking and the track roller assembly without failing.

Third, through the engagement of the wheel body, the cap element and the limiting element can prevent the relative rotation of the wheel body and the cap element. Furthermore, the engagement of the thread with the screw can further prevent the cap element from moving toward the X-axis direction.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A track roller assembly, comprising:
   two wheel bodies connected to each other, and each of the two wheel bodies having a plurality of threads, wherein one of the wheel bodies comprises a convex portion, and the other of the wheel bodies comprises a concave portion, the convex portion is correspondingly engaged into the concave portion;
   two bearings disposed on the two wheel bodies, respectively;
   a wheel axle disposed through the two bearings;
   two cap elements, each of the two cap elements having a plurality of screws corresponding to the plurality of threads, and the plurality of screws correspondingly locked and engaged in the plurality of threads;
   two rotating oil seals, wherein each of the two rotating oil seals comprises a first side and a second side, the first side is connected to one of the cap elements, and the second side rotatably abuts the wheel axle;
   two end covers connected to opposite two ends of the wheel axle, respectively; and
   an oil body limited to an accommodating space formed by the two wheel bodies, the wheel axle, the two cap elements and the two rotating oil seals.

2. The track roller assembly of claim 1, further comprising:
   two O-rings, each of the two O-rings disposed between each of the two cap elements and each of the two wheel bodies, and each of the two O-rings made of a flexible material.

3. The track roller assembly of claim 2, wherein a ring groove is disposed on an inner wall of each of the two wheel bodies, and each of the two O-rings is disposed between the ring groove and each of the two cap elements.

4. The track roller assembly of claim 3, wherein,
   a plurality of slots are disposed on an outer wall of each of the two cap elements, and the plurality of slots are arranged with an interval from each other; and a plurality of limiting notches are disposed on an inner wall of each of the two wheel bodies, and each of the two limiting elements is disposed between one of the plurality of limiting notches and one of the plurality of slots of the two cap elements.

5. The track roller assembly of claim 1, further comprising:
two limiting elements, each of the two limiting elements disposed between each of the two cap elements and each of the two wheel bodies, and each of the two limiting elements limiting each of the two cap elements.

6. The track roller assembly of claim 5, wherein a limiting groove is disposed on an inner wall of each of the two wheel bodies, and each of the two limiting elements is disposed between the limiting groove and each of the two cap elements.

7. The track roller assembly of claim 6, wherein,
each of the two limiting elements comprises a first limiting section and a second limiting section, the first limiting section is connected to the second limiting section, and the first limiting section is engaged into the limiting groove; and
each of the two cap elements comprises at least one fixing groove, and the second limiting section is engaged into the at least one fixing groove.

8. The track roller assembly of claim 1, further comprising:
two first plugs, each of the two first plugs detachably connected to each of the two end covers and the wheel axle.

9. The track roller assembly of claim 1, wherein each of the two rotating oil seals comprises at least one oil blocking portion and a dustproof portion, the at least one oil blocking portion and the dustproof portion rotatably abut the wheel axle, and the dustproof portion is farther from the oil body than the at least one oil blocking portion.

10. The track roller assembly of claim 1, further comprising:
at least one second plug connected to one of the cap elements and one of the wheel bodies.

* * * * *